June 23, 1953

N. T. BALDANZA

2,643,158

METHOD OF MAKING MOLDED BRUSHES

Filed June 25, 1947

INVENTOR.
Nicholas T. Baldanza
BY
Louis Shumacher
ATTORNEY.

June 23, 1953 N. T. BALDANZA 2,643,158
METHOD OF MAKING MOLDED BRUSHES
Filed June 25, 1947 3 Sheets-Sheet 2

INVENTOR.
Nicholas T. Baldanza
BY
Nino Schumacher
ATTORNEY

June 23, 1953 N. T. BALDANZA 2,643,158
METHOD OF MAKING MOLDED BRUSHES
Filed June 25, 1947 3 Sheets-Sheet 3

INVENTOR.
Nicholas T. Baldanza
BY
Louis Shumacher
ATTORNEY.

Patented June 23, 1953

2,643,158

UNITED STATES PATENT OFFICE 2,643,158

METHOD OF MAKING MOLDED BRUSHES

Nicholas T. Baldanza, Rutherford, N. J., assignor, by mesne assignments, to Columbia Protektosite Co., Inc., Carlstadt, N. J., a corporation of Delaware Application June 25, 1947, Serial No. 756,889

4 Claims. (Cl. 300—21)

This invention relates to improvements concerning the construction and manufacture of articles such as brushes.

One object of the invention is the provision of improvements in the process and apparatus involved in the manufacture of articles of the character described, and also in the construction of such articles, wherein strands or bristles are embedded in the body of the article in course of molding of the body.

Another object of the invention is to furnish such improvements involving the avoidance of burning or deterioration of the strands or tufts by the molding heat. Another object of the invention is to furnish improvements whereby leakage of molding material about the strands or tufts is avoided even if the molding is affected at high pressure.

The art has long sought practical and inexpensive ways and means for making articles such as brushes by molding the heads or backs thereof directly about the tufts to thus embed and secure the tufts without the utilization of any auxiliary means such as staples and the like. Various difficulties were encountered, among which was the tendency of the tufts to weaken or deteriorate under the molding heat. For example, it was proposed to thus embed nylon bristles in a plastic head, but it was found that the bristles lost some of their stiffness so that the brush was unsatisfactory. Another difficulty was that the plastic would leak through around the bristles particularly if made by injection molding which is the method today most generally used for the high speed molding of articles.

It is therefore an object of the invention to provide improvements overcoming these difficulties and to produce an improved strong embedment of the bristles or tufts by the use of simple, strong, high speed, accurate molds adapted for rapid loading, the brush produced being neat in appearance and adapted for easy cleaning, and with its bristle strength fully maintained.

Other objects of the invention concern features of improvement adapted to be used singly or collectively, including the provision of tufts contracted in a tight manner at their point of emergence from the back, but with the embedded portion otherwise free to spread for powerful anchorage; strands of bristles reenforcingly secured together at their inner ends as by a hardening material which may be part of the bristles themselves, or bristles which are centrally folded for an especially strong embedment; and strands or bristles whose stiffness may be varied by a particular construction of the body of the brush.

Another object of the invention is to furnish improvements for compacting a tuft and for sealing the same to the wall of the mold.

Another object of the invention is to furnish improvements involving the provision of a series of protuberances on the body at the tufts or strands thereof, thus forming sections which solidify with increased rapidity to seal the mold at the tuft and to assist such sealing on the part of the clamped compacted tuft.

Other objects and advantages of the invention will become apparent as the specification proceeds.

With the aforesaid objects in view, the invention comprises the novel features, combinations and arrangements of parts hereinafter described in their preferred embodiments, pointed out in the subjoined claims, and illustrated in the annexed drawing, wherein like parts are designated by the same reference characters throughout the several views.

The advantages of the invention as here outlined are best realized when all of its features and instrumentalities are combined, but useful embodiments may be produced involving less than the whole.

It will be obvious to those skilled in the art to which the invention appertains, that the same may be incorporated in several different constructions. The accompanying drawing, therefore, is submitted merely as showing a preferred exemplification of the invention.

Generally described, the invention provides improvements in the art whereby tufts or strands are loaded to project into a mold in which a fusible material or one which is adapted to otherwise harden, is formed into a body in which the tufts are embedded by the molding operation. The materials for the strands or tufts and for the body are selected so that the tufts shall not become overheated and thus caused to deteriorate. If required, a side of the mold, adjacent to the tufts may be at relatively lower temperature than the rest of the mold, or may be constructed to form small sections at the tufts adapted to chill with increased rapidity. In certain cases, the tufts themselves may be subjected to refrigeration before insertion into the mold. While the molding occurs, the tufts are compressed to compact the strands thereof and to tightly fit the tuft openings of the mold to avoid leakage of the fused material. This is essential even if the molding is effected at little or no pressure and is absolutely necessary in the case of the extreme high pressures of injection molding. Thus loss of molding material is avoided and the tufts do not become spoiled or clogged by molding material. Such sealing of the mold is accomplished without preventing easy loading of the tufts into the mold even where a multiplicity of tufts are so employed. Preferably the tuft openings are caused to act as if subjected to contraction around the bristles by the particular constructions hereinafter described. At the points where the tufts are contracted, the body of the brush is preferably formed with small protuberances which congeal more rapidly than the relatively large main mass of the body which will retain the heat for some time. This assists in the sealing of the tuft openings and is particularly effective in a chilled mold. If the back of the brush were thin, rapid chilling could be obtained so that this function of the protuberances would not be required, but the practise is to provide a thick back on a brush. However, these protuberances serve an additional function in that the fusible material is caused to flow in a solid stream to the very point of clamping and contraction of the tuft, thus avoiding a series of untidy and straggly filaments of plastic material discernable along the strands of the tuft. An article such as a brush thus produced possesses various distinctive advantages. Dirt will not enter the tuft openings of the back and the latter will be easier to clean especially at the smooth and uniform protuberances, with the strands of the tufts being highly compacted thereat. These protuberances may be varied in length to regulate the stiffness of the bristles in a brush which is otherwise of generally regular contour. Other improvements and advantages will be described hereinafter.

Certain general considerations as well as the terminology employed will not be discussed. The invention is applicable to all easily fusible materials including metals of low melting point and thermosetting plastics as well as those which harden by cooling. In fact, certain features of the invention may be advantageously used with relatively non-fusible, adhesive or cementitious materials adapted to harden from a liquid state or when mixed with water. The molds employed for these various materials may include normally open or closed molds or dies, in which the molding occurs without pressure or at moderate or high pressure. In all such cases, leakage of the molding material must be prevented at the tufts or strands. The molding may occur at relatively high or at room temperatures, or under conditions in which the mold is chilled or in which the mold is heated as in the case of thermosetting materials. The tufts or strands may consist of animal, vegetable, metallic, or synthetic fibres or filaments, single or multi-ply, or of bunches, clusters, or tufts thereof. The term "tuft" may be used to refer to a cluster, the strands whereof have not been bound together before embedment in a body. The latter may form a head, handle or back of any article of a utilitarian or decorative character, with the tufts being flexible, stiff, or relatively soft according to the function of the article. An "end" of a strand or tuft may refer to the bight end where such strand or tuft is folded. Due to the large variety of materials available for the strands or tufts and for the molded bodies, it is not possible nor feasible to give definite temperature relationships between the fusing or hardening temperatures and the temperatures at which the strands or tufts would fuse or deteriorate; it is believed that this is a matter well within the province of one skilled in the art following the teaching herein. In general, the materials should be selected so that the strands or tufts shall not be caused to deteriorate by the molding heat, and preferably a substantial temperature margin ought to be allowed to guard against accidental variations in course of molding, and with due consideration for the fact that it is difficult to ascertain the temperature within the mold, and that the temperatures may be different in different parts of the mold, and that the temperature may in any event vary from time to time due to various factors including the size of the molded part, the speed of molding and the rate at which heat is applied or abstracted. In the case of bristles made of a plastic such as nylon, for example, which is popular because of its stiffness, overheating will cause the same to permanently soften and weaken. To guard against variations in rapid quantity production, it is therefore preferred that the strands or tufts shall not be fused to the body of the article and that the heat involved shall be substantially below the temperature of the deterioration. Accordingly, the strands or tufts should most desirably be secured to the body or article by tight frictional contact obtained by the bonding molding embedment under the conditions provided by this invention. In certain cases, the bristles may be caused to extend sufficiently deep into a large body, to become fused at their inner ends where the temperature is highest, but without becoming overheated at the points near the surface of the body where the bristles emerge. An apparatus provided by the invention is adapted to be fully automatic in respect to the loading of the tufts and the molding of the articles, but it will be appreciated that various operations can be manually performed, as for example in respect to the sealing of the tufts, unless otherwise specified. Other features of the invention will be described hereinafter.

Figure 1:
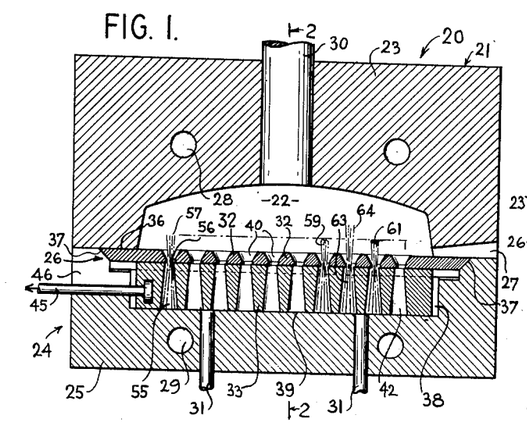
Figure 1 is a sectional view showing apparatus embodying the invention and illustrating in dot-dash lines certain features involved in the molding operation according to the invention.

Referring in detail to the drawing, 20 denotes an apparatus embodying the invention and illustrating the improvements in the process of making articles such as brushes. This apparatus comprises a mold 21 having a cavity 22 for the molding of a head or body of the article. This cavity is provided by any suitable mold structure which for simplicity comprises a wall 23 and a section 24. The latter may include a member 25 which may be considered a support or a wall of the mold. The section 24 may also include a member 26 adapted to function as a wall complemental to the member 23. Between the latter and the section 24 is a gate 27 for the injection of a plastic. The members 23 and 25 may have respective passages 28, 29 through which is circulated a cooling fluid. Article ejector rods may comprise a rod 30 in the member 23 and rods 31 in the member 25.

Figure 3:
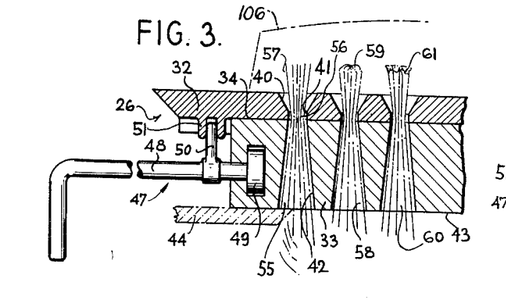
Fig. 3 is an enlarged fragmentary sectional view illustrating in dot-dash lines certain features involved in the process and particularly indicating the removal of a wall of the mold for releasing the brush, and also showing a modified means for actuating the tuft clamping means from the locked position of Fig. 1 to the released position of Fig. 3.

The section or member 26 is preferably removable as shown in Fig. 3. It may comprise a plurality of plates 32, 33, which are in sliding contact with each other at the surface 34. If desired, these plates may be interconnected by any suitable means as by a dovetailed fit at 35 at opposite sides whereby they are always maintained in precision relationship with each other as a unit. The member 32 may be regarded as a wall complemental to the wall 23 and the member 33 may be regarded as the clamping and sealing device presently described. The member 32 affords a parting line 36 for the mold and it may have inclined seating engagement at 37 with the member 25 to assure perfect register with the cavity 22. The member 33 may be less in length and width than the member 32 but is preferably substantially thicker for reasons presently apparent. The member 25 is formed with a chamber 38 to receive the section 26 with such clearance as may be necessary, but the member 33 preferably has snug seating engagement at the surface 39.

Formed in the member 32 are one or more openings or holes 40 adapted to receive strands or tufts herein shown in dot-dash lines. Desirably, a multiplicity of these openings are furnished according to any desired spacing and arrangement so that a field of tufts can be embedded in the body molded in the cavity 22. Each opening 40 may be of circular or any other shape, and each preferably expands or flares inwardly toward the main part of the mold cavity. Thus the openings 40 are of conoidal shape and they should be regarded as sections of the mold cavity representing recesses of much smaller volume or cross sectional area than the main part of the latter. At its small end, each opening 40 lies substantially at the inner surface of the mold, or at least at the surface 34 on the outside of the member 32, and at this surface each opening provides an edge 41 which is as thin as possible, but not so sharp as to cut the bristles. Of course, the openings 40 may also be hemispherical or otherwise shaped. At their narrowest point, they are sufficiently small to freely but snugly receive a strand or tuft according to the size thereof.

Figure 4:
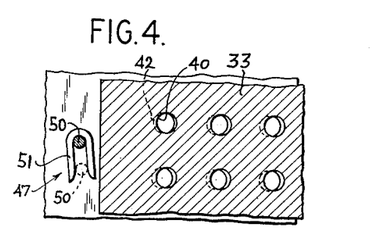
Fig. 4 is a fragmentary plan view of a portion of the actuator means in locking position.

The member 33 is provided with one or more openings 42 adapted to register with the openings 40 as shown in Fig. 3, and being of such size and shape as to furnish smooth and continuous passages for the tufts. To permit the latter to be easily entered into the openings 42, the same are preferably outwardly flared. Upon causing sliding movement of the member 33 relative to the member 32, for instance along the dovetail joints 35, the openings 42 are moved slightly out of register with the openings 40 as shown in Figs. 1 and 4 thus causing clamping of the tufts and compacting of the strands thereof. In this condition parts of the member 33 block off portions of the openings 40 and serve as closures for such portions, while at the same time the compacted tuft serves as a tight plug for the rest of the opening 40. It is of course contemplated that each tuft have the same number of strands and that these strands shall be of like character and thickness. In this way all the tufts or strands will be uniformly clamped in condition to cause sealing of the mold, even at the high pressures involved in injection molding. I have constructed a mold as in Fig. 1, and have molded a satisfactory brush therein.

By reason of the construction described, the clamping of the tufts at the surface 34 may be said to occur at the inner surface of the mold cavity 22, it being remembered that the openings 40 are parts of this cavity. Also the clamping and sealing may be said to occur at the outer face of the mold wall 32.

The length of the openings 42 is sufficient so that when a tuft is operatively positioned, its outer ends terminate flush with the outer side of the member 33 as at the surface 39. In fact this surface 39 may constitute a gaging surface for a precision positioning of the tufts so that the outer ends of the bristles shall lie in a perfect plane and with the inner ends of the bristles being all embedded to a uniform depth to the back of the brush. In fact, the outer face 43 of the member 33 may be utilized as a gage along which a knife 44 may be moved to cut the strands or tufts from long lengths unwound from reels. It may be added that the taper of the opening 42 may be so slight or may be so formed as not to produce a cutting edge at their small ends such as would cut the bristles when locked in the position of Fig. 1.

The member 33 may be slid manually as by rod or arm 45 connected thereto and lying in a slot opening 46 of the member 25 whereby it can be removed with the unit 26. This arm may be automatically operated to exert the proper degree of force at the precise time. Preferably an actuating and locking means 47 of modified form shown in Figs. 3 and 4 is employed. The same may comprise a bar or handle 48 having a head 49 journalled in the member 33 and carrying a finger 50 adapted to cooperate with a positive or slotted cam member 51, the opening whereof may be closed-ended to serve as a stop. Upon turning the handle 48, the finger 50 may travel from the dot-dash line position of Fig. 4 in which the section 26 is unlocked or released to the full-line position in which the member 33 is slid to sealing condition as shown in Fig. 1. Cam 51 may be sufficient in size to maintain the engagement between the rotary finger 50 and the linearly moving member 32 to which the cam is affixed. A slight movement of the member 48 will suffice for actuation of the member 33. The member 48 may be moved between opening and closing position by any suitable means actuated by the main shaft of the automatic molding machine.

An important advantage of the locking device 47 is that it forms a part of the section 26 so that the latter may be removed and locked and then assembled as part of the mold 21. In this way accidental slippage of the tufts would be avoided. In this connection it may be noted that if the passages 42 are upright in the mold, the loaded tufts may shift by gravity to uniformly seat on the surface 39.

Figure 2:
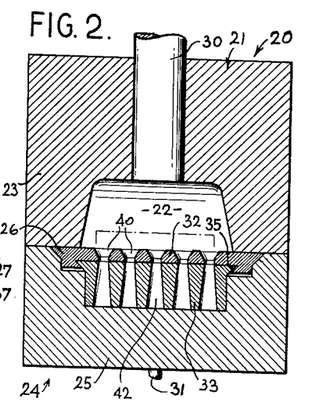
Fig. 2 is a similar sectional view on the line 2—2 of Fig. 1.
Figure 12:
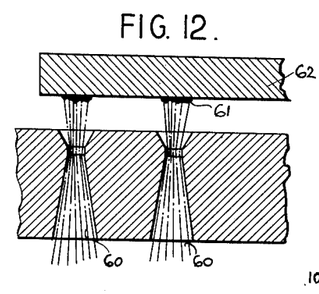
Fig. 12 is a fragmentary sectional view illustrating method and apparatus for fusing together the ends of the bristles of a tuft.

Different types of tufts are shown operatively mounted in Figs. 1, 2, and 3. One type is indicated at 55 as consisting of strands having opposite free ends. These strands are preferably free of any interconnection therebetween. The tuft 55 is pinched or compressed adjacent the surface 34, thus providing a highly compacted and tight-fitting plug-like sealing portion or neck 56 from which the adjacent end portions 57 extend free of any compression and in a loose or flared manner, thereby facilitating engagement with the molded plastic by some or all of the individual strands, and ultimately producing a headlike portion that will powerfully anchor the tuft in the molded body or article. Another type of tuft is shown at 58, this being folded to provide a bight portion 59 affording a superior anchorage as the plastic may flow at least part way within the bight. However, the tuft 58 involves the additional operation of folding as compared with the simpler type of tuft 55. At 60 is shown still another type of tuft, the strands of which are originally free-ended, except that they are secured together at their inner ends at 61 by a suitable material that is adapted to harden, and this effect may be obtained by applying a hot iron 62 to the gang of tufts as shown in Fig. 12. This can be effected when the section 26 is loaded and locked in its removed position. The head 61 may be substantially thicker than the tuft due to some spreading effect on the part of the iron 62. The heads 61 may afford a superior anchorage for each individual strand, and such a fusion at 61, being wholly local will not cause deterioration of the bristles. At 63 is shown still another kind of a tuft, the embedded portion of which is caused to project much deeper into the back or body of the brush so that the innermost end portions 64 become fused thereto by the temperature of the molding material. As the surface of the back is approached and the chilling effect of the mold increases, the temperature drops to the point where no deterioration of the bristles occurs near such surface. Deterioration is to be avoided immediately adjacent to the points where the bristles emerge from the back.

I have found that with a clamping and sealing structure such as 26, there is a tendency for the embedded tufts to slightly incline in one direction, this apparently being due to the fact that the plate 33 tends to tilt each tuft. This condition may be partially avoided by the structure shown in Fig. 5 and can be wholly avoided by the structure shown in Fig. 6.

Figure 5:
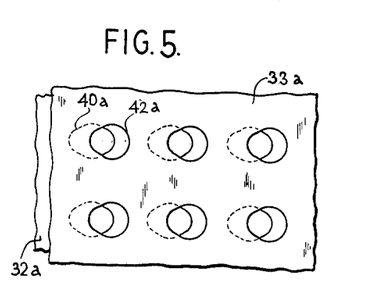
Fig. 5 is a fragmentary plan view of a modified tuft clamping structure in locking position.

In Fig. 5 the device 26 is employed modified only in respect to the shape of the holes. The view shown is diagrammatic, the conical shape of the openings being omitted for clarity. The plates 32a and 33a correspond to those shown at 32 and 33, and the openings 40a and 42a correspond to those shown at 40 and 42. One or both of these sets of openings may be elliptical or egg-shaped as shown, the irregularity involved being in opposite direction or phase and being so coordinated that when the device 26 is in the released position of Fig. 3, the openings 40a and 42a cooperate to form an elongated or elliptical passage, and when the device 26 is locked as in Fig. 1, these openings cooperate to form circular openings so that the tufts are molded in circular form. More important is the fact that the openings 40a and 42a exercise opposed lateral camming effects on each tuft for compressing the same, and thus the component of force tending to deflect the tuft from a true right angle relation to the back of the brush is substantially reduced.

Figure 6:
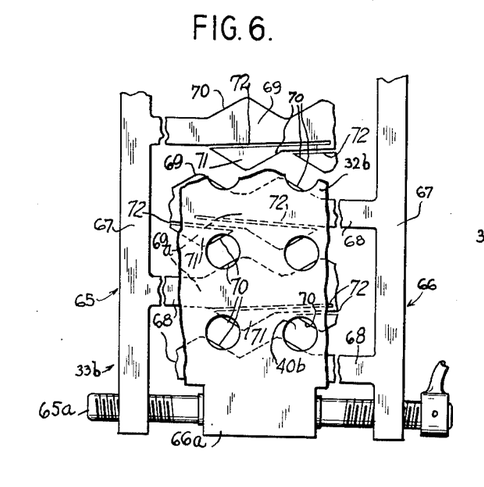
Fig. 6 is a fragmentary plan view of another modification of a tuft clamping means in locked position.

In Fig. 6 there is a plate 32b corresponding to that at 32 and a means 33b corresponding to the plate 33. Means or member 33b may consist of elements 65, 66 which may be identical but movable in opposite directions to exert opposed clamping forces on each tuft so that the latter is maintained at a true vertical when finally molded into the back of the brush and removed from the mold. Each element, 65, 66 comprises a bar 67 from which extend a plurality of strips or tines 68 each of these having a series of cam portion 69 with intervening narrower or recessed portions 69a. The elements 68 extend between the rows of openings 40b which correspond to the openings 40 and the cam portions 69 provide cam edges 70 adapted to block off parts of those openings and to cause compression of the tufts. It is noted that one cam side of an element 68 presses against the tufts of one row and the other cam side of that element presses against the tufts of another row so that the lateral stresses on the element are balanced. It is further noted that when these members 65, and 66 are moved toward each other in precisely equal degree, the cam edges 70 of a pair of elements 68 exert opposed and equal pressures on intervening tufts, and since the movements involved are in opposed directions, the stresses on each tuft do not tend to set up tilting strains in the tuft. The openings 40b may be elliptical or otherwise shaped, and the cam edges 70 may be correspondingly shaped so that when the compression is applied, the resultant tuft passages are substantially perfectly circular somewhat in line with the principle of the device of Fig. 5. It will be perceived that the members 65, 66 may be said to have openings between the elements 68 at the cam edges 70 adapted to move into register with the openings 40b, this being obtained when the members 65, 66 are moved away from each other. Within the scope of the apparatus 20 it may be considered that the means 65, 66 causes the openings to move into register and partially out of register with the openings 40b upon relative movement with respect to the plate 32b in directions of different phase. It will be understood that the members 65, 66 may be actuated as a unit, and if preferred may be interconnected by a linkage or cam means so that an actuating force may be applied to the member 65 to move it in one direction, and this member in turn actuating the member 66 for equal movement in the opposite direction. For example a turnbuckle screw 65a having a fixed bearing at 66a may interconnect the elements 65, 66 for movement of the latter in equal degree in different directions, this screw being actuated manually or automatically. If it be desired to allow for possible variation in the number of bristles in the tufts, resilient elements or flat tongues 71 may be formed by fine slots 72 at one side of the elements 68 of the members 65, 66. These slots may be made substantially longer than shown.

Figure 7:
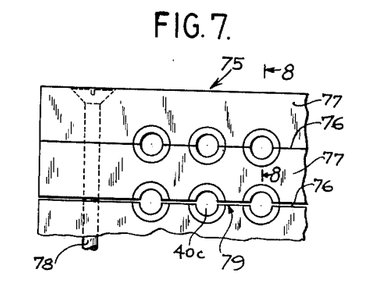
Fig. 7 is a fragmentary plan view of another tuft clamping means with a part thereof in locked position and a part in open position.
Figure 8:
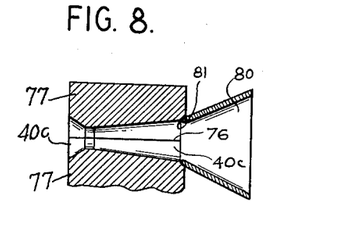
Fig. 8 is a sectional view on the line 8—8 of Fig. 7.

In Figs. 7 and 8 is shown a modification comprising a wall 75 of the mold which may or may not be removable and which may be split along parallel lines 76 to provide a plurality of strips 77 which may be interconnected by bolts or guide rods 78 that will permit these strips to move toward and away from each other for expansion and contraction of the openings 40c which correspond to those shown at 40. For loading the tufts into these openings, the strips may be slightly separated as shown at 79 with the tufts being passed through guide tubes 80 to prevent any of the strands from entering the slot-like openings 79. If desired, each opening may be formed with a minute entrance as at 81 for guiding the funnel-shaped tubes 80, and the latter may be removed as the openings 40c are contracted or thereafter. This device illustrates the principle of a multiplicity of tuft receiving openings adapted to expand and contract by the employment of few and simple parts. Of course the wall 75 may be suitably supported and braced by a wall 33 or in any other suitable manner, and such wall may comprise the elements 80.

Figures 9, 10:
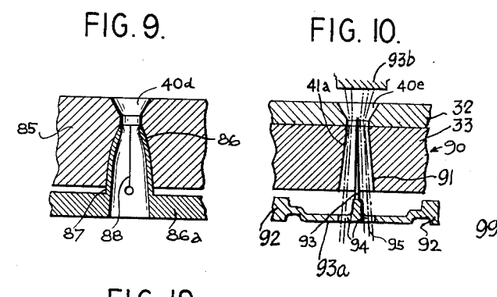
Fig. 9 is a fragmentary sectional view in locking position of another modification of tuft clamping means.
Fig. 10 is a fragmentary sectional view of another modification of tuft clamping means with the tuft indicated in dot-dash lines.

In Figs. 9 and 10 are shown modifications illustrating the axial compression or sealing of tuft openings. Thus in Fig. 9 the wall 85 may have cam-like entrances 86 leading to its openings 40d; a plate 86a which may correspond to that shown at 33 may have ferrules 87 split at 88 to freely receive the tufts and to tightly contract with the split 88 completely closed by the cam face 86. Thus the ferrule 87 serves as a spring expansion clutch.

In Fig. 10 a wall 90 is provided with openings 40e corresponding to those shown at 40 but having tapered entrances 91 leading thereto. A plate 92 is provided with a series of needles 93 of tapered form each adapted to centrally enter the openings 91 to cause compacting of the tuft and sealing of the opening 40e by expansion of the tuft. The extreme end of the needle may be relatively sharp or somewhat blunt as required by the nature of the bristles, and this end portion may move into or slightly beyond the narrow opening section 41a. In the plate 92 there are openings 94 through which the strands 95 comprising the tufts can be fed about the needle. The needle may be entered after the entire tuft is in proper position. To avoid shifting of any strands, the latter are preferably cut after the tuft has been locked in place by the expansion needle. If it be desired to allow for variation in the number of bristles of pre-cut tufts, the needle may be variably projected by mounting the same on strip or plate spring portions 93a. Inward movement of bristles by the needle may be arrested by a temporary gage plate 93b. If plate 90 comprises plates 32, 33, the tuft may be locked at least partially prior to or during projection of the needle.

Figure 11:
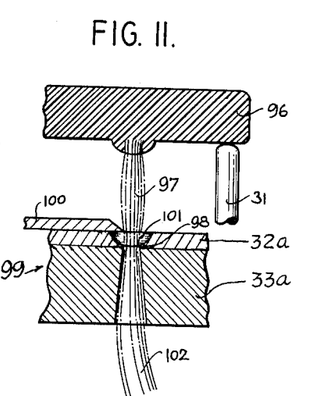
Fig. 11 is a fragmentary sectional view of another modification of tuft clamping means and illustrating a modified process according to the invention.

In Fig. 11 is shown a modified apparatus and method of making an article such as a brush. Here a part 96 of the body of the article with the tuft 97 embedded therein is utilized to exert the substantial degree of tension required in pulling the tuft through the constricted opening 98 of a plate 99 which corresponds to the plate 32. Ejectors such as 31 may cause the back 96 to be ejected to just the right degree, whereupon a knife 100 cuts the tuft 97 at a point such that a section 101 of the bristles 102 remains projecting into the mold to just the proper extent for suitable embedment in the next article that is to be molded. This device has the disadvantage that the degree of clamping is rather limited since otherwise it would not be possible to pull the strands through the opening at 98, but this method may be utilized with advantage for molding at low pressures. The bunch of strands may be initially entered into the mold opening in any suitable manner, for example by cementing or fusing together the ends of the bristles to form a solid rodlike structure which may then be cut to form a point, and forced through the mold opening. Any of the clamping-sealing devices may be used, such as plates 32a, 33a like those at 32, 33, and the wall 99 may be curved like a segment of a cylinder for forming a brush with a curved lower face on its head. The clamping is performed before molding and is released when the bristles are to be moved.

In the operation of the apparatus 20, after the article has been molded, the member 33 may be caused to operate first, and thereafter the ejectors 31 acting upon the member 33 may lift the article together with the section 26 for removal as a unit from the mold as indicated in Fig. 3. Then the completed article or brush is removed from the section 26, and the latter reloaded with tufts and again assembled in the apparatus 20 for another molding operation.

Figure 13:
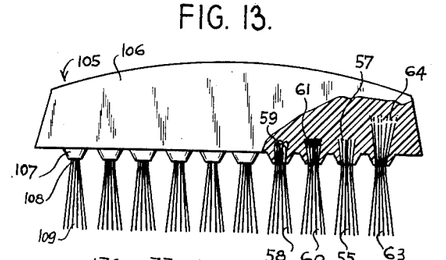
Fig. 13 is an edge view of a brush with a part in section showing a brush embodying the invention and illustrating different kinds of tufts embedded therein.

The invention produces an article such as a brush 105 having a back 106 with the tufts mentioned hereinbefore embedded in the back as a direct result of the molding operation. This back is formed with protuberances 107 formed in the openings 40, and the tufts are also embedded in these protuberances. The latter afford a neat and attractive appearance and facilitate the cleaning of the brush. Immediately adjacent to the ends of these protuberances, the tufts are secured in tightly clamped or compacted position as at 108, and beyond this point, the tufts may form expanded or headlike sections as at 109, these being available by union with the plastic or by folding the bristle, or by preliminarily uniting the ends thereof as at 61. The structure is highly durable and reliable and will not afford any openings at which dirt can enter the brush back around the bristles.

Figure 14:
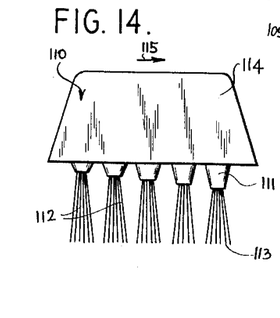
Fig. 14 is an end view of a modified brush according to the invention.

In Fig. 14 is shown a modified brush 110 which is like that shown at 105 except that its protuberances 111 may vary in length to correspondingly vary the stiffness of the tufts 112. This is possible by correspondingly changing the openings 40 and the plane surface at 34 may be changed to suit. In this structure all the bristles terminate in a horizontal plane parallel to the back 114 of the brush to preserve geometrical uniformity. By using the brush in the direction of the arrow 115, the relatively short tufts produce a powerful brush action which diminishes in the direction of the relatively long tufts. Other modifications and arrangements of the principle involved will be apparent to those skilled in the art.

The invention embodies a process of making an article or brush having a molded body or head with strands or tufts embedded therein by the molding operation. In hot molding, as with the true thermoplastics and also with thermosetting materials, the materials of the body and of the strands or tufts are selected to avoid overheating of the latter; this of course may not be a factor with metallic bristles. Where possible, the temperatures for thermosetting are reduced and the heating somewhat prolonged; and where chilling is relied upon to harden the material, the cooling is made more effective by increasing its rate at least at selected parts of the body adjacent to the strands, or by pre-chilling the latter, or by the provision at the strands of sections of such small mass as to chill with increased rapidity. The last mentioned condition may be particularly effective if the strands or tufts are embedded solely in such sections, for example, in the said proturberances, and the latter may of course be increased in size for that purpose. Overheating is also prevented by avoiding leakage of the molding material around the bristles so that the abstracted heat shall not be replenished. Leakage of the molding material should be prevented in any case, regardless of temperature or pressure; injection molding would not be possible unless leakage is fully controlled or completely stopped. But in respect to the heat factor, elimination of leakage may be the answer to the difficulties heretofore encountered in regard to overheating of the strands or bristles. Further, by preventing leakage, there is no loss of valuable molding material, and the tufts do not become clogged thereby. For good engineering, fusion of the strands to the body is preferably avoided, to assure against any possibility of deterioration of strands, and complete and continuous bonding is relied upon by frictional engagement or by interlocking with the body of tufts that are folded or whose inner ends are interconnected or merely free of sealing pressure. The utilization of the small mass sections or protuberances may in certain cases afford sufficiently rapid sealing at low pressures, but preferably this factor is utilized in aid of a mechanical means which pressure compacts the strands or bristles and seals the opening through which they extend into the mold. Such direct mechanical sealing may be utilized without employing the small mass sections or protuberances. For injection molding, it is preferred to employ both factors. The mechanical sealing means may constitute parts of the mold itself, or may consist of means ancillary thereto. The term "sealing means" may include the openings 40. The sealing means may act in circumferential, lateral, or axial directions, or in combinations thereof, with contraction or expansion of the tuft whose strands are compacted in either case. Expansion of a tuft may have the advantage of increasing the size of the tuft as well as the strength of its molded embedment. The tuft openings or passages may freely receive the tufts and nevertheless initially hold them with sufficient snugness to avoid accidental shifting until these openings or passages are in effect contracted to clamp the tufts and cause the sealing. In every case the tuft must be held sufficiently tight to prevent its expulsion even at extremely high molding pressures. Wherever strands or tufts are stated as being pressure compacted or where the opening is stated to be pressure sealed therearound, it is contemplated that the engagement is sufficient to prevent such expulsion by the molding material. Certain strands may be more susceptible to compacting or even to compression more than others, by reason of the materials used, or because of the shape of the strands. Satisfactory results have been obtained with hard bristles of circular shape, in injection molding. Triangular bristles may be used to interfit with each other. The tufting forms a sealing plug when pressure compacted. The principle of the section 24 in respect to completely housing and gaging the tufts may be utilized in all the various modifications. The apparatus 20 is operative with the tufts in horizontal or in any other position. It will be appreciated that the section 26 can be loaded from either its upper or its lower face. The section 26 may also be designed to form a brush having a curved surface at the bristles, for which purpose the plates 32 and 33 can be constructed as segments of a cylinder whose axis is transverse to the plane of Fig. 1.

Figure 15:
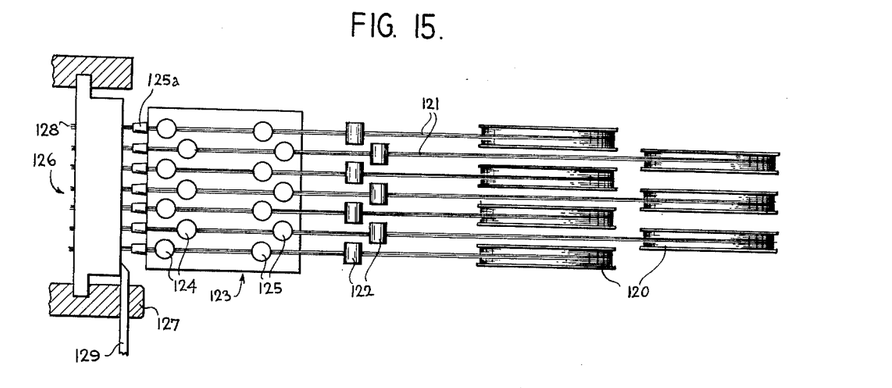
Fig. 15 is a diagrammatic plan view with a part in section illustrating an improved system for the manufacture of articles such as brushes, with the bristles consisting of strands of great length.

In Fig. 15 is shown a system for the manufacture of articles of the character referred to by the use of strands or tufts of substantial length. For example, there is a series of reels 120 each of which is capable of feeding a single tuft as indicated at 121, each length of material 121 comprising any desired number of strands or bristles, and all of the tufts being of uniform thickness or mass. These tuft lengths may pass through straightening rollers 122 adapted to bend the tufts or to otherwise act thereon so as to eliminate any curvature that may have been caused by the reels 120. The latter may be of any desired large diameter. These tuft lengths are then received by a device 123 of any suitable character. Such devices are well known in the art for feeding wire, cord and the like, and hence are only schematically illustrated herein. The device 123 may comprise clutch devices 124 adapted to reciprocate so as to feed forward a tuft length upon the advance stroke of the clutch and to release the same for the retraction stroke of the clutch. This advance movement is performed simultaneously by all of the clutches for a distance equal to the length of the tuft which is to be fed into the mold. At 125 is a series of devices for the individual tuft lengths adapted to engage the same by a releasable clutching action or merely frictional, and serving to permit a free advance movement of the tuft lengths, but preventing reverse movement thereof as in the case where a clutch 122 fails to properly release upon retraction. The tuft lengths 121 are thus guided through eye members 125a, to the mold 20, or at least to a moved section 136 thereof which is intended to correspond to the section 26. The section 126 is mounted in a fixed station such as a frame or jig 127 so that the perforations of the section 126 are in accurate alinement with the eye members 125a. The advance movement of the clutches 124 feeds the tuft lengths sufficiently to provide free end portions of the tufts projecting to a predetermined extent at 128 for embedment in the body that is to be molded in the manner hereinbefore described. Guide and gage frame 127 may also carry a knife 129 movable along a surface of the section 126 as hereinbefore indicated in Fig. 3 for cutting all of the tufts. Now the section 126 can be removed for assembling with the mold 20, and during this removal the clutches 124 may be at rest or may begin their retraction. The openings 42 may have substantially less taper than shown to facilitate the making of a clean cut by the knife 129. Accordingly, the system illustrates how a mold section can be utilized as part of a system for forming tufts of predetermined length and also for a precision positioning of the tufts in the mold. It will be appreciated that instead of the reels, long straight lengths of tufts or bristles may be employed.

In showing a section 126, corresponding to that at 26, it is not intended thereby to limit the invention. The section 126 may comprise any of the other sealing devices for the tufts, and in each case the tufts loaded into such section may be clamped or sealed to that section before being severed by the knife 129 or at least prior to removal from the guide frame 127.

Figure 16:
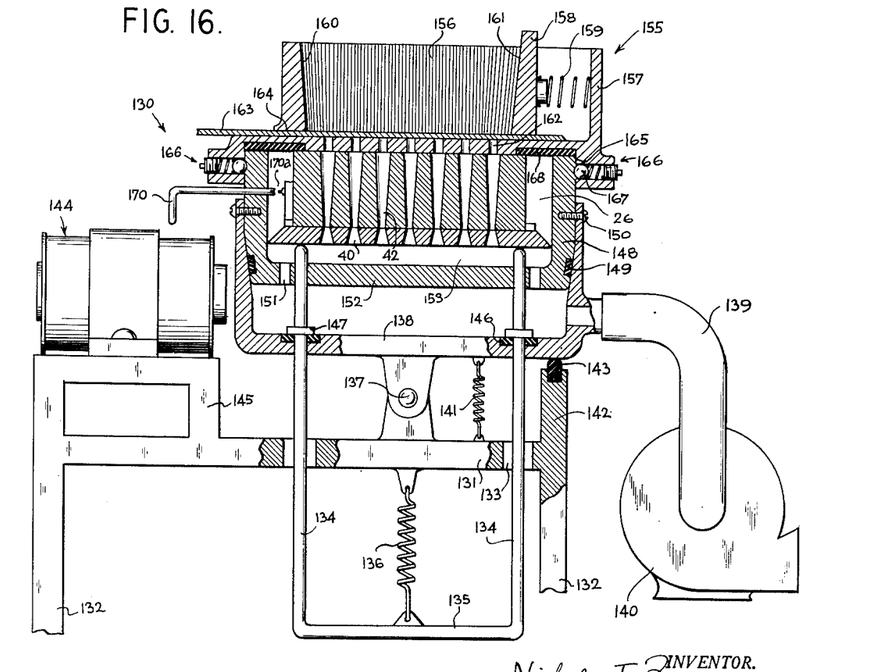
Fig. 16 is a vertical sectional view with parts broken away and certain parts in elevation showing an improved system for the manufacture of articles such as brushes, by utilizing bristles of pre-cut length.

At 130 is indicated an improved apparatus exemplifying a novel method for the loading of the mold section 26 comprising the step of utilizing bristles or strands of a pre-cut length. In this case also, the section 26 is intended to illustrate generally a mold or a part thereof including any type of a tuft clamping and sealing means as explained in regard to the section 126. Bristles are often sold pre-cut, and hence the importance of the instant modification. Apparatus 130 comprises a base 131 resting on suitable legs 132 and having holes 133 through which extend the ejector rods 134 hereinafter described. These rods may be interconnected by a head 135 which is centrally connected by a tension coil spring 136 with the base 131. A mounting that is adapted to permit vibration may include a pivot 137 carried by the base 131, on which pivot is centrally tiltably mounted a casing 138 adapted to provide a large air chamber or conduit which is connected by a rubber hose 139 to suction pump 140. A tension coil spring 141 acting between the base 131 and the casing 138 tends to hold the casing in horizontal position against upward extending abutment 142 on the base 131, said abutment having a rubber cushioning pad 143. An electromagnet 144 is mounted on a section 145 at the base in operative relation to a side wall of the casing 138 so as to act in opposition to the spring 141 for causing oscillatory vibration of the casing 138. The ejectors 134 extend through holes in the bottom wall of the casing 138 at which they are air-sealed by gaskets 146, and normally overlying the latter in contact therewith are the collars 147 on the ejector rods. Seated within the upper portion of the side walls of the casing 138 is casing 148 air-sealed with the former as by gaskets 149 and desirably fixedly secured to the casing 138 as by screws 150. The ejectors 134 project into the casing 148 through the bottom wall thereof, which wall is formed with a series of openings 151 whereby air communication in a distributed manner is furnished between the casings 138 and 148. The casing 148 is of such size and shape as to snugly receive the section 26, and in fact is adapted to serve as a gage for precision positioning of that section. In this regard, the ejectors 134 as limited by the collars 147 serve to hold the section 26 at a predetermined distance upon the bottom wall 152 of the casing 148 to thus determine the positioning of the bristles in section 26 as hereinafter described. The space referred to provides a conduit 153 intercommunicating the openings 40 and 42 with the air chamber 138.

At 155 is shown means adapted to act on a large mass of bristles 156 to produce therefrom tufts having a like number of bristles. The means 155 may comprise a compartment 157. If desired, this compartment may have a piston 158 actuated by a light expansion coil spring 159 for gently compacting the mass of bristles 156. Preferably opposed faces 160 and 161 of a wall of the casing and of the piston 158 may taper downward slightly, so that the compacting of the mass of bristles 156 is a little greater near the lower ends thereof, or for the alternative purpose of permitting some freedom in the upper parts of the bristles to facilitate vibratory movement thereof. The bottom wall of the compartment 157 is provided with openings 162. Registering with the openings 42 of the section 26, a blade 163 is removably disposed along the bottom of the compartment 157 through an opening 164 to support the bristles and piston in order to prevent bristles from being prematurely lodged in the openings 162. At the bottom of the compartment 157, the same may have a depending rectangular wall 165 snugly removably receiving the casing 148 and desirably releasably locked thereto as by the spring detent devices 166 each of which may comprise a spring-pressed ball 167 adapted to engage in a slight recess of the casing 148. Rubber gaskets 168 may afford an air-seal between the compartment 157 and the casing 148, and end portions of the section 26, if desired. It is contemplated that the locking devices 166 shall be superior of the spring 136. The latter causes the ejectors 134 to tend to upwardly remove the section 26 from the casing 148. The locking devices should also be adequate to maintain the air seal at 168, and nevertheless the compartment 157 should be readily removable without requiring any manual release of the devices 166. These results are readily accomplished by proper consideration of the weight of the parts opposing the spring 136.

The method involved in the apparatus 130 will now be described. The section 26 is dropped into the casing 148, and then compartment 157 is placed thereon, depressing the ejectors 134 to the position shown and causing eventual locking of the compartment 157 to the casing 148 at the devices 166. With the blade 163 in place, a mass of bristles 156 is inserted into compartment 157, keeping all of the bristles uniformly vertical. In this position the bristles may be evened out by hand if necessary. Now the piston 158 is released, a pump 140 is started and the blade 163 is removed and at the same time the electromagnet 144 is energized. The pump produces a vacuum causing air to flow about the bristles 156, through the openings 162, 42, 40, the conduit 153 and the suction distributor chamber 138. The suction or vibration, but preferably both combined, cause the openings 162 to serve as gages to receive bristles of like number throughout. This may be facilitated by sharp or square upper edges of these openings. The suction flow acts on the ends of the bristles tending to suck them in to the openings 162. The compacting of the bristles is regulated for the desired amount of air flow. Now it is important to note that the wall 162 serves as a stop for the tufts. In other words, the tufts are ultimately received in the openings 40, 42 in the precise position required for use in the mold 20, the projecting end portions of the tufts being determined by the size of the conduit 153. It is noteworthy that when the tufts are so properly positioned in section 26, the upper ends of the tufts form closures for their respective gage openings 162 and hence the effectiveness of the suction will be maintained as to those points at which the tufts have not yet been fully formed. Thus another bristle required to form the proper member for the tuft may enter even after a series of its companion bristles have already been fully received in the openings 40, 42. The upwardly tapered passage 42 facilitates the entering of the bristles, but opposes some increased friction as the bristles approach the narrow part, thereby slowing up the travel of the bristles to permit retarded bristles to catch up with the others. At the completion of the loading, the suction may be momentarily substantially increased. The vibration, which may be vertical, may be relatively small, being limited between the electromagnet 144 and the stop 142. Finally the suction is cut off or the pump 140 stopped, the compartment 157 is removed, and the ejectors 134 gently elevate the section 26 to a point at which any suitable locking device such as 47 may be manipulated. Since the tufts are frictionally secured at the narrow parts of the passages 40, 42, such gentle elevating of the section 26 will not cause the bristles to shift. If shifting does occur, it will be righted when section 26 contacts the surface 39 in the mold. However, if preferred, a slidable, rotatable handle bar 170 may be mounted as a permanent part of the casing 148 so as to manipulate any suitable locking device 170a, for example like that at 47, not shown here, the locking to take effect while the bristles are in contact with the wall 152, and this mode of operation permitting the bristles to be quite loose in the openings 40 and 42 to facilitate a freer flow of the air.

The bristles remaining in the compartment 157 may be rearranged and other bristles added thereto, to repeat the cycle, or such remaining bristles may be placed in a bin to be subsequently rearranged in true parallel relation with each other, electrostatically or by other suitable means known in the art.

The apparatus 130 exemplifies a method of producing tufts from a pre-cut mass of bristles, and loading the tufts into a mold as the tufts are produced.

Figure 17:
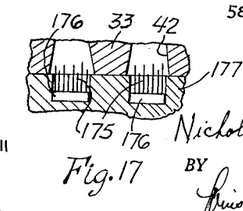
Fig. 17 shows a fragmentary sectional view of means for obtaining unevenness in the ends of the bristles.

In Fig. 17 are shown short bristles 175 of wire or the like precut and arranged in different lengths and mounted in molded or clamping bases 176 fixedly set into recesses 177 of the plate 178 corresponding to that at 25. The bristles 175 press upwardly and shift the bristles 55 in the mold 20 so that the bristles of the final tufts project to different degrees for better penetration into the hair. A much more non-uniform effect is obtained at the ends of the tufts than heretofore.

I claim:

1. A method of manufacturing a brush utilizing injection molding of thermoplastic resinous material comprising the steps of inserting brush tufts into spaced apart openings provided in a wall of a mold cavity in forming a bristle supporting back, reducing the cross sectional area of said openings after said insertion to clamp the tufts under pressure effective to seal the clamped region of the tufts against leakage flow preparatory to injection molding of said back, and injecting said material under heat and pressure into the mold cavity in a fluid state while maintaining said sealed clamping until fusion of said material and tufts takes place upon cooling.

2. A method of manufacturing a brush utilizing injection molding of thermoplastic resinous material comprising the steps of inserting a brush tuft into an opening provided in a wall of a mold cavity in forming a bristle supporting back, seal clamping said tuft in a predetermined region about said opening effective against leakage flow preparatory to injection molding of said back, and injecting under heat and pressure said material into the mold cavity in a fluid state while retaining said region effective to seal clamp the tuft until fusion of said material and tuft embedded therein takes place upon cooling.

3. A method of manufacturing a brush utilizing injection molding of thermoplastic resinous material comprising the steps of inserting brush tufts into spaced apart openings provided in a wall of a mold cavity in forming a bristle support clamping the tufts in the region of said openings to seal said openings against leakage of the molding material from the mold in a predetermined plane, and simultaneously injecting said material under heat and pressure into the mold cavity and maintaining said clamping seal until fusion of said material and tufts takes place upon cooling.

4. A method of manufacturing a brush utilizing injection molding of thermoplastic resinous material comprising the steps of inserting a brush tuft into an opening provided in a wall of a mold cavity in forming a bristle supporting back, injecting under heat and pressure said material into the mold cavity in a fluid state, and simultaneously seal clamping said tuft in the region about said opening effective against leakage flow of said molding material and maintaining said sealed clamping until fusion of said material and tuft takes place upon cooling.

NICHOLAS T. BALDANZA.

References Cited in the file of this patent

UNITED STATES PATENTS

| Number | Name | Date |
|---|---|---|
| 562,930 | Shrady | June 30, 1896 |
| 572,347 | Look | Dec. 1, 1896 |
| 654,184 | Schwartz | July 24, 1900 |
| 674,121 | Montgomery | May 14, 1901 |
| 798,381 | Alexander | Aug. 29, 1905 |
| 824,503 | Morrison | June 26, 1906 |
| 957,255 | Pushee | May 10, 1910 |
| 1,148,566 | Barry | Aug. 3, 1915 |
| 1,212,313 | Barry | Jan. 16, 1917 |
| 1,402,990 | Adams | Jan. 10, 1922 |
| 1,695,159 | Sherman | Dec. 11, 1928 |
| 2,078,358 | Wright | Apr. 27, 1937 |
| 2,202,292 | Howard | May 28, 1940 |
| 2,303,800 | Swann | Dec. 1, 1942 |
| 2,417,750 | Hall | Mar. 18, 1947 |